(12) United States Patent
Zhu

(10) Patent No.: US 12,201,896 B2
(45) Date of Patent: Jan. 21, 2025

(54) GAME CONTROLLER AND GAME CONSOLE

(71) Applicant: Shenzhen Jinyang Huichuang Technology Company, Ltd., Guangdong (CN)

(72) Inventor: Jiarui Zhu, Shenzhen (CN)

(73) Assignee: Shenzhen Jinyang Huichuang Technology Company, Ltd. (CN)

( * ) Notice: Subject to any disclaimer, the term of this patent is extended or adjusted under 35 U.S.C. 154(b) by 340 days.

(21) Appl. No.: 17/633,808

(22) PCT Filed: May 28, 2021

(86) PCT No.: PCT/CN2021/096577
§ 371 (c)(1),
(2) Date: Feb. 8, 2022

(87) PCT Pub. No.: WO2022/236882
PCT Pub. Date: Nov. 17, 2022

(65) Prior Publication Data
US 2023/0356074 A1   Nov. 9, 2023

(30) Foreign Application Priority Data
May 14, 2021 (CN) .......................... 202110531250.8

(51) Int. Cl.
*A63F 13/24* (2014.01)
*A63F 13/23* (2014.01)
(52) U.S. Cl.
CPC .............. *A63F 13/24* (2014.09); *A63F 13/23* (2014.09)

(58) Field of Classification Search
CPC .......... A63F 13/20; A63F 13/23; A63F 13/24; A63F 13/25; A63F 2300/10; A63F 2300/1043; A63F 2300/1056
USPC ...................................... 463/36–37
See application file for complete search history.

(56) References Cited

U.S. PATENT DOCUMENTS

| | | | |
|---|---|---|---|
| 7,833,097 B1 * | 11/2010 | Maddox | A63F 13/23 463/47 |
| D728,030 S | 4/2015 | Burgess et al. | |
| D730,451 S | 5/2015 | Burgess et al. | |
| D733,802 S | 7/2015 | Burgess et al. | |
| 9,089,770 B2 | 7/2015 | Burgess et al. | |
| D748,734 S | 2/2016 | Burgess et al. | |
| 9,289,688 B2 | 3/2016 | Burgess et al. | |
| 9,308,450 B2 | 4/2016 | Burgess et al. | |

(Continued)

*Primary Examiner* — Milap Shah
(74) *Attorney, Agent, or Firm* — Timothy T. Wang; Ni, Wang & Massand, PLLC

(57) ABSTRACT

The application provides a game controller and a game console. The game controller comprises a first button electrically connected with a first main board, when the first button is triggered, the first main board can generate specific feedback information, so that a game character can perform specific operations. By arranging the first button at a position at the rear shell of the controller, a user can press the first button through a middle finger or a ring finger, which is convenient for the user to operate with multiple fingers at the same time. Furthermore, by rotating the pressing structure at the junction of the rotating structure and the pressing structure as a pivot to press the first button, the shape of the pressing structure can be adapted to the actual needs of the user, and the user has a better operational experience.

10 Claims, 9 Drawing Sheets

(56) References Cited

U.S. PATENT DOCUMENTS

| | | | |
|---|---|---|---|
| 9,308,451 B2 | 4/2016 | Burgess et al. | |
| 9,352,229 B2 | 5/2016 | Burgess et al. | |
| 9,492,744 B2 | 11/2016 | Burgess et al. | |
| D777,260 S | 1/2017 | Burgess et al. | |
| 9,533,219 B2 | 1/2017 | Burgess et al. | |
| 9,550,116 B2 | 1/2017 | Burgess et al. | |
| D780,180 S | 2/2017 | Ironmonger et al. | |
| D780,759 S | 3/2017 | Ironmonger et al. | |
| D780,760 S | 3/2017 | Ironmonger et al. | |
| 9,707,479 B2 | 7/2017 | Burgess et al. | |
| 9,713,768 B2 * | 7/2017 | Uy | G06F 3/0362 |
| D794,027 S | 8/2017 | Ironmonger et al. | |
| 9,878,238 B2 | 1/2018 | Burgess et al. | |
| 9,908,040 B2 * | 3/2018 | Hackney | A63F 13/22 |
| 10,029,175 B2 | 7/2018 | Burgess et al. | |
| 10,188,940 B2 | 1/2019 | Burgess et al. | |
| 10,220,308 B2 | 3/2019 | Ironmonger et al. | |
| 10,232,254 B2 * | 3/2019 | Gassoway | A63F 13/98 |
| 10,258,877 B2 | 4/2019 | Burgess et al. | |
| 10,272,325 B1 * | 4/2019 | Nevarez | A63F 13/98 |
| 10,279,250 B2 | 5/2019 | Burgess et al. | |
| 10,286,305 B2 | 5/2019 | Burgess et al. | |
| 10,350,490 B2 | 7/2019 | Ironmonger et al. | |
| 10,406,431 B2 * | 9/2019 | Campbell | A63F 13/24 |
| 10,427,036 B2 | 10/2019 | Burgess et al. | |
| 10,441,881 B2 | 10/2019 | Burgess et al. | |
| 10,463,979 B2 * | 11/2019 | Dornbusch | A63F 13/23 |
| 10,576,386 B2 | 3/2020 | Ironmonger et al. | |
| 10,596,453 B2 | 3/2020 | Burgess et al. | |
| 10,596,455 B2 | 3/2020 | Burgess et al. | |
| D881,125 S | 4/2020 | Ironmonger et al. | |
| D881,282 S | 4/2020 | Ironmonger et al. | |
| D881,283 S | 4/2020 | Ironmonger et al. | |
| 10,668,371 B2 * | 6/2020 | Guerrero, Jr. | A63F 13/24 |
| D889,549 S | 7/2020 | Ironmonger et al. | |
| D889,550 S | 7/2020 | Ironmonger et al. | |
| 10,722,786 B2 * | 7/2020 | Bellinghausen | A63F 13/98 |
| 10,835,812 B2 * | 11/2020 | Gassoway | A63F 13/98 |
| 10,843,069 B2 | 11/2020 | Ironmonger et al. | |
| 10,857,454 B2 | 12/2020 | Burgess et al. | |
| 10,870,051 B2 | 12/2020 | Burgess et al. | |
| 10,940,386 B2 | 3/2021 | Ironmonger et al. | |
| 10,967,252 B2 | 4/2021 | Ironmonger et al. | |
| 11,013,986 B2 * | 5/2021 | Ironmonger | A63F 13/24 |
| 11,103,796 B1 * | 8/2021 | McDonell | E05B 73/0082 |
| D934,343 S * | 10/2021 | Ali | D14/401 |
| 2002/0128064 A1 * | 9/2002 | Sobota | A63F 13/245 |
| | | | 463/37 |
| 2012/0244944 A1 * | 9/2012 | Kotkin | A63F 13/24 |
| | | | 463/37 |
| 2015/0283458 A1 * | 10/2015 | Burgess | A63F 13/24 |
| | | | 463/37 |
| 2016/0082349 A1 * | 3/2016 | Burgess | A63F 13/24 |
| | | | 463/37 |
| 2016/0228765 A1 * | 8/2016 | Rubio | A63F 13/24 |
| 2016/0310841 A1 * | 10/2016 | Offerdahl, III | A63F 13/24 |

\* cited by examiner

GAME CONTROLLER AND GAME CONSOLE

CROSS REFERENCE TO PRIORITY

This application is a continuation application of international application of PCT/CN2021/096577 with a filing date of May 28, 2021, which based on Chinese Patent No. 202121039129.5, filed on May 14, 2021. The disclosures of the prior application are incorporated by reference herein in its entirety.

FIELD OF THE INVENTION

The application relates to a game console and more specifically to a game controller.

BACKGROUND OF THE INVENTION

Most existing game controllers are usually held and operated by users with both hands. A conventional controller usually includes a hard shell with multiple controls installed around the controller. Typically, the controls include buttons, analog joysticks, bumpers, triggers, and so on. At present, all controls are installed at the front face and top portion of the controller. Specifically, there are left and right analog joysticks, which generally control motion and are intended to be operated by the left and right thumbs of a user, respectively. There are four buttons on the front right portion of the controller, which usually control additional actions and are operated by the user's right thumb. There are directional keys located at the front left portion of the controller. Bumpers and triggers are also present on the top portion of the controller. Sometimes some games require the user to press several buttons simultaneously or continuously to perform specific game skills or maneuvers. However, this kind of game operation can be difficult to actualize, as ordinary users generally cannot easily perform such operation timely, resulting in a poor user experience.

SUMMARY OF THE INVENTION

The object of the present invention is to provide a game controller which is used to solve the technical problem in the prior art of games requiring the user to press a plurality of buttons simultaneously or continuously to realize specific game skills, while ordinary users cannot actualize the operations easily or timely. To solve the above technical problems, the present invention adopts the following technical solutions:

In one embodiment, there is a game controller, comprising a shell including a front shell and a rear shell opposite to each other, the game controller further comprising: a first main board arranged in the shell; a first button electrically connected with the first main board, wherein a user can drive the first main board to generate feedback information when pressing the first button; a rotating structure fixed on the rear shell; a pressing structure comprising opposite first and second end portions, and a connecting portion between the first and second end portions, wherein the connecting portion is rotationally connected with the rotating structure, the first end portion is located near the first button, and a user can press the second end portion so that the first end portion presses down on the first button.

The game controller further comprises: a fixing assembly arranged on the rear shell; a second main board arranged in the fixing assembly and electrically connected with the first main board, wherein the first button is arranged on the second main board and faces the first main board.

The fixing assembly comprises: a first fixing member and a second fixing member corresponding to the first fixing member, wherein a fixing cavity for installing the second main board is defined in the first fixing member and the second fixing member; and the rotating structure is arranged on the first fixing member.

The rotating structure comprises: a rotating base and a rotating shaft disposed at the bottom of the fixing cavity; and a connecting hole defined in the middle of the connecting portion for the rotating shaft to pass through, wherein the rotating shaft passes through the connecting hole, and the connecting portion can rotate relative to the rotating shaft.

The game controller comprises at least two rotating structures. The plurality of rotating structures are arranged at intervals, each rotating structure is correspondingly provided with one pressing structure, and the second main board is provided with a plurality of first buttons, each corresponding to one pressing structure.

The first fixing member is arranged on a side of the rear shell away from the front shell, and the rear shell contains a wiring hole for wires that electrically connect the first main board and the second main board.

The first fixing member is arranged on a side of the rear shell facing the front shell, and the rear shell defines second pressing holes for the pressing structures to pass through, wherein each pressing structure corresponds to one second pressing hole respectively.

A pressing plate penetrating through and fixed on the fixing assembly is parallel to the second main board. One end of the pressing structure is arranged in the pressing plate, and the other end of the pressing structure is arranged near the first button, so that a user can press the pressing plate, so that the pressing structure presses the first button.

The pressing plate defines an embedded groove for installing the pressing structure. The embedded groove is provided with connecting protrusions therein. The pressing structure defines connecting slots corresponding to the connecting protrusions, and the connecting protrusions are inserted into the connecting slots.

The first fixing member, the pressing plate and the second fixing member are stacked. The pressing plate comprises pressing ends at two sides and a fixing portion in the middle between the two pressing ends, wherein the fixing portion overlaps with both the first fixing member and the second fixing member. The fixing portion defines an escape hole in the middle. The fixing portion is fixed between the first fixing member and the second fixing member.

An upper edge of the first fixing member is provided with a projection which extends towards the fixing cavity and is provided with a press-fit plate for press-fitting with the second main board. The projection is also provided with an engaging member opposite to the press-fit plate. The second fixing member is fixed on the first fixing member through the engaging member.

In a second aspect, the application also provides a game console, which comprises a game console and the above game controller, and the game console and the game controller exchange information.

Compared with the prior art, the game controller provided by the invention has several advantages. By arranging the first button electrically connected with the first main board, the first main board can generate specific feedback information when the first button is triggered, so that a game character can perform specific operation in a game. By arranging the first button at the rear of the shell, the user can press the first button through the middle finger or the ring finger, which is convenient for the user to operate. Then, by arranging the rotating structure and the pressing structure on the rear shell and rotating the pressing structure at the junction of the rotating structure and the pressing structure as a pivot to press the first button, the shape of the pressing structure can be adapted to the actual needs of users, and therefore the users have a better operation experience.

DETAILED DESCRIPTION OF THE INVENTION

Figure 1:
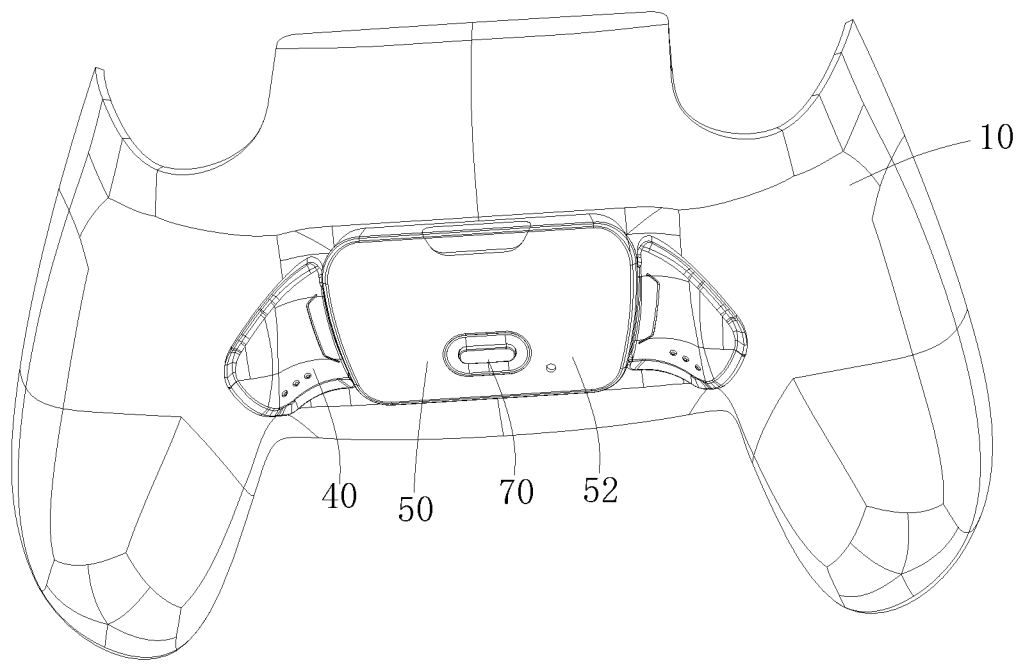
FIG. 1 is a first schematic structural view of a game controller provided in a first embodiment of this application.

In order to solve the technical problems of the prior art, and to make the technical solutions and beneficial effects of this application clearer, the present invention and its embodiments will be described in detail with reference to FIGS. 1-17. It should be understood that the specific embodiments described herein are only used to explain the invention, and are not used to limit the scope of the invention.

It should be noted that when an element is said to be "fixed" or "arranged" on another element, it may be directly on another element or indirectly on another element. When an element is said to be "connected" to another element, it can be directly connected to another element or indirectly connected to another element.

It should be understood that the terms "length", "width", "upper", "lower", "front", "rear", "left", "right", "vertical", "horizontal", "top", "bottom", "inside" and "outside" indicate orientational or positional relationships based on the orientational or positional relationship shown in the figures, which is only for the convenience of describing the invention and simplifying the description, and does not indicate or imply that the referred device or element must have a specific orientation, be constructed and operated in a specific orientation, so it cannot be understood as limiting the application.

In addition, the terms "first" and "second" are only used for descriptive purposes, and cannot be understood as indicating or implying relative importance or implicitly indicating the number of indicated technical features. Therefore, the features defined with "first" and "second" can explicitly or implicitly include one or more of the features. In the description of this application, "a plurality" means two or more, unless otherwise specifically defined.

Referring to FIGS. 1-17, a game controller provided by several embodiments of the invention will now be described. This embodiment provides a game controller, which comprises a shell consisting of a front shell and a rear shell (10) opposite to each other. The front shell and the rear shell (10) can be either separate or integral. The front shell and the rear shell (10) are only used to distinguish the opposite sides of the game controller. The front shell is provided with the same controls as those found in existing game controllers. The controls are normally operated by a user with his thumb and forefinger, while the rear shell (10) is provided with structures by which the user generally operates with his middle finger or ring finger.

The game controller also comprises: a first main board, not shown in the figures, which is the native main board of the game controller and is mainly used for directly feeding back information to the game console; a first button (20) electrically connected with the first main board, which can drive the first main board to generate specific feedback information when the user presses the first button (20), wherein for example, pressing the first button (20) by the user can actuate the function of pressing a plurality of conventional buttons; a rotating structure (30) fixed on the rear shell (10); a pressing structure (40) having a first end portion (41) and a second end portion (42) opposite to each other, and further comprising: a connecting portion (43) between the first end portion (41) and the second end portion (42), wherein the connecting portion (43) is rotationally connected with the rotating structure (30), the first end portion (41) is located near the first button (20), and a user can press the second end portion (42) so that the first end portion (41) presses the first button (20).

Compared with the prior art, the game controller provided by the application has the following beneficial effects: by arranging the first button (20) electrically connected with the first main board, the first main board can generate specific feedback information when the first button (20) is triggered, so that a game character can perform specific operation in the game. By arranging the first button (20) at a position at the rear shell (10) of the shell, a user can press the first button (20) with his middle finger or ring finger, which is convenient for the user to operate when pressing multiple controls simultaneously. Then, by arranging the rotating structure (30) and the pressing structure (40) on the rear shell (10) and rotating the pressing structure (40) with the junction of the rotating structure (30) and the pressing structure (40) as a pivot to press the first button (20), the shape of the pressing structure (40) can be adapted to the actual needs of the user, and therefore the user has a better operational experience.

Figure 2:
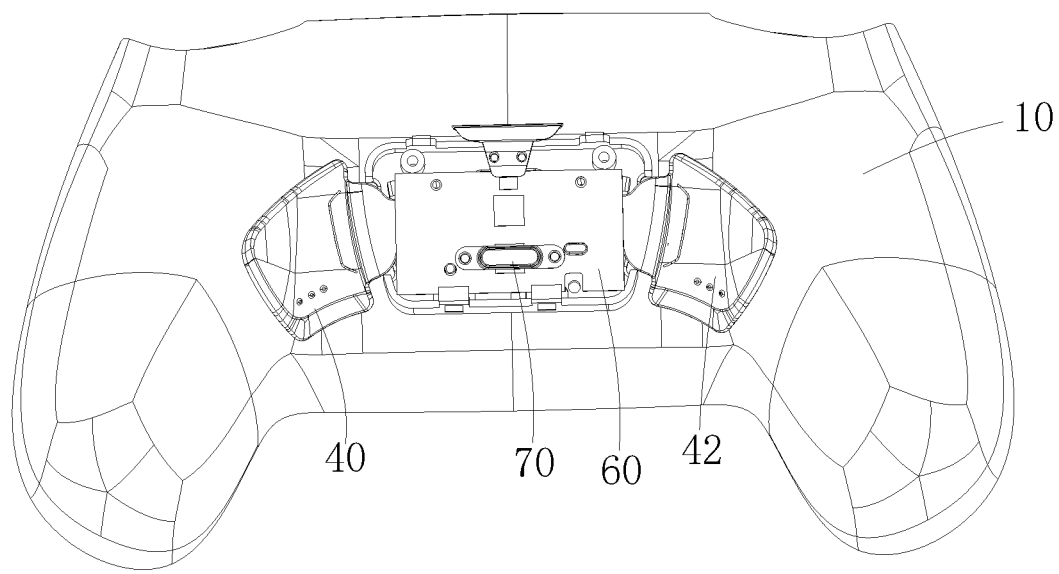
FIG. 2 is a second schematic structural view of the game controller provided in the first embodiment of this application.
Figure 3:
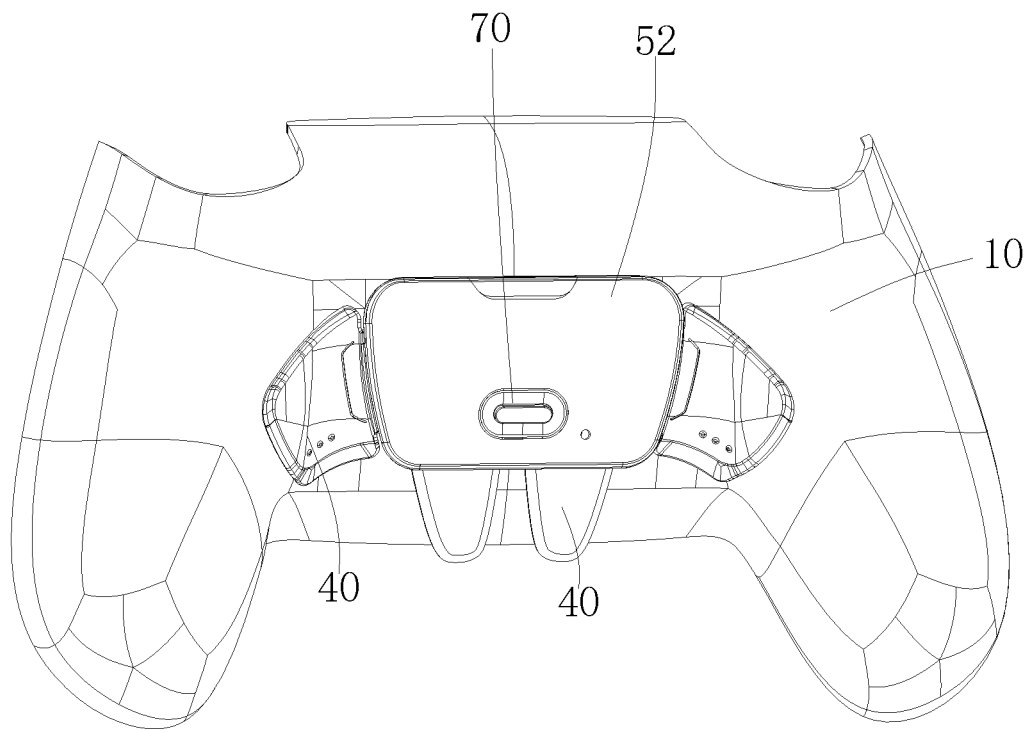
FIG. 3 is a third schematic structural view of the game controller provided in the first embodiment of this application.
Figure 4:
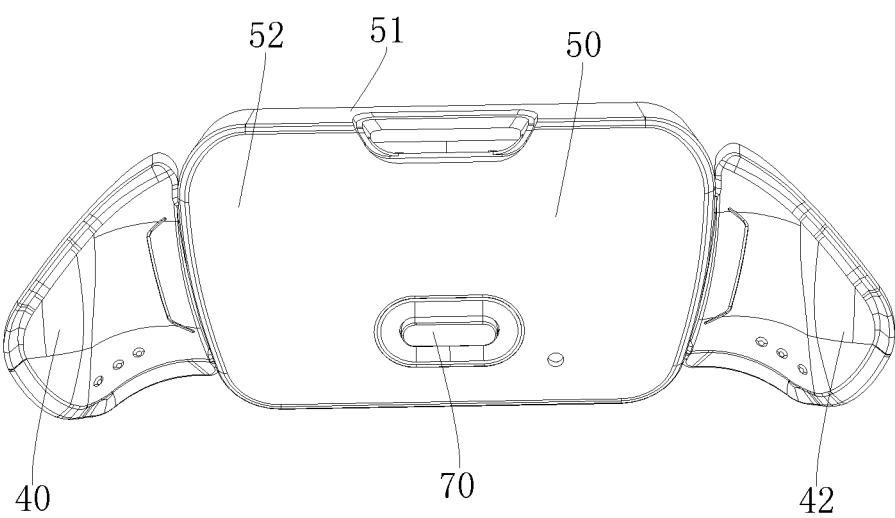
FIG. 4 is a schematic structural view of a fixing assembly and a rotating structure provided in the first embodiment of this application.

Referring to FIGS. 1-3, in the first embodiment, the game controller also includes: a fixing assembly (50) arranged on the rear shell (10), which is detachably arranged on the rear shell (10), and can be disassembled for maintenance or inspection when the controller is damaged; and a second main board (60) which is arranged in the fixing assembly (50). The first main board (20) and the second main board (60) are electrically connected. The first button (20) is arranged on the second main board (60) and faces a side of the first main board. The first main board and the second main board (60) can be electrically connected by wires. The user's operation of pressing the first button (20) can be fed back to the first main board through the second main board (60), and then the first main board feeds back the information to the game device so that the game device can display specific game operation.

Referring to FIGS. 4-8, in the first embodiment, the fixing assembly (50) includes a first fixing member (51) and a second fixing member (52) corresponding to the first fixing member (51), wherein a fixing cavity (53) for installing the second main board (60) is defined in the first fixing member (51) and the second fixing member (52). The rotating structure (30) is arranged on the first fixing member (51). By arranging the second main board (60) in the fixing cavity (53), the second main board (60) can be effectively fixed, and the second main board (60) will not be easily damaged when used. In addition, since the first fixing member (51) is arranged on the rear shell (10) and the second fixing member (52) is arranged on the first fixing member (51), even if the game controller is damaged, the second fixing member (52) will be disassembled for inspection first in conventional maintenance method. Even if the second fixing member (52) is disassembled frequently, the pressing structure (40) will not be affected, so that the service life of the pressing structure (40) can be maintained.

Referring to FIGS. 5-8, in the first embodiment, the rotating structure (30) includes a rotating base (31) and a rotating shaft (32) arranged at the bottom of the fixing cavity (53). A connecting hole (431) through which the rotating shaft (32) passes is defined in the middle of the connecting portion (43), and the connecting portion (43) can rotate relative to the rotating shaft (32). Specifically, the rotating base (31) has an opening facing the second main board (60), and the rotating shaft (32) can be disassembled from the opening or inserted through the opening. During assembly, the rotating shaft (32) is inserted into the rotating base (31) through the opening after passing through the connecting hole (431) of the connecting portion (43), so that the pressing structure (40) can rotate around the rotating shaft (32). Of course, the opening can also be provided in the direction of the lateral side of the rotating base (31), as long as the rotating shaft (32) can be correspondingly installed, which is not limited here.

Referring to FIGS. 1-6, in order to ensure that the first end portion (41) can stably press the first button (20) when the rotating structure (30) rotates around the rotating shaft (32), the rotating structure (30) can be made of hard material and constructed in an arc-shaped structure with the connecting hole (431) at the top of the arc shape. Of course, the rotating structure (30) can also adopt a partially curved structure, as long as the first button (20) can be pressed. In addition, a protrusion for pressing the first button (20) may be provided at the first end portion (41). So long as the first button (20) can be stably pressed, any of the above ways can be adopted.

Referring to FIGS. 1-5, in the first embodiment, the game controller includes at least two rotating structures (30). The plurality of rotating structures (30) are arranged at intervals, each of which is correspondingly provided with one pressing structure (40). The second main board (60) is provided with a plurality of first buttons (20) each corresponding to one pressing structure (40). Conventionally, the game controller includes a left grip portion and a right grip portion. There are two rotating structures (30), and the two rotating structures (30) are respectively located at two sidewalls of the fixing cavity (53). One of the two second end portions (42) faces the left grip portion and the other faces the right grip portion. Of course, according to the actual needs of the user, the number of first buttons (20) can be increased to realize specific operation requirements of the user. Similarly, the orientation of the pressing structure (40) can be adapted to the actual needs of the user, and can be toward the left grip portion or the right grip portion, or in the same direction as the left grip portion or the right grip portion, as long as the operational requirements of the user can be met.

Referring to FIGS. 1-3, in the first embodiment, the first fixing member (51) is arranged on a side of the rear shell (10) away from the front shell, and the rear shell (10) defines a wiring hole for wires electrically connecting the first main board and the second main board (60). By defining the wiring hole, the wires are convenient to pass through. Of course, the first fixing member (51) can be provided with a locking element at a position corresponding to the wiring hole, which can lock the first fixing member (51) on the rear shell (10) to assist the fixing of the first fixing member (51), so that the first fixing member (51) can be sufficiently firmly fixed.

Figure 5:
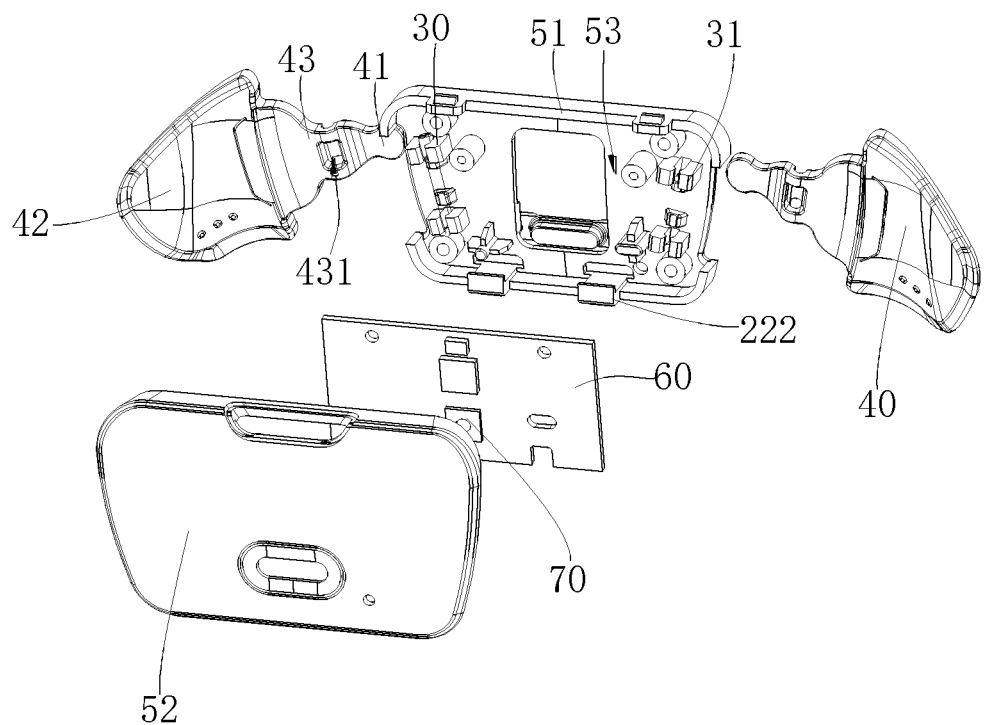
FIG. 5 is an exploded structural view of the fixing assembly and the rotating structure provided in the first embodiment of this application.
Figure 6:
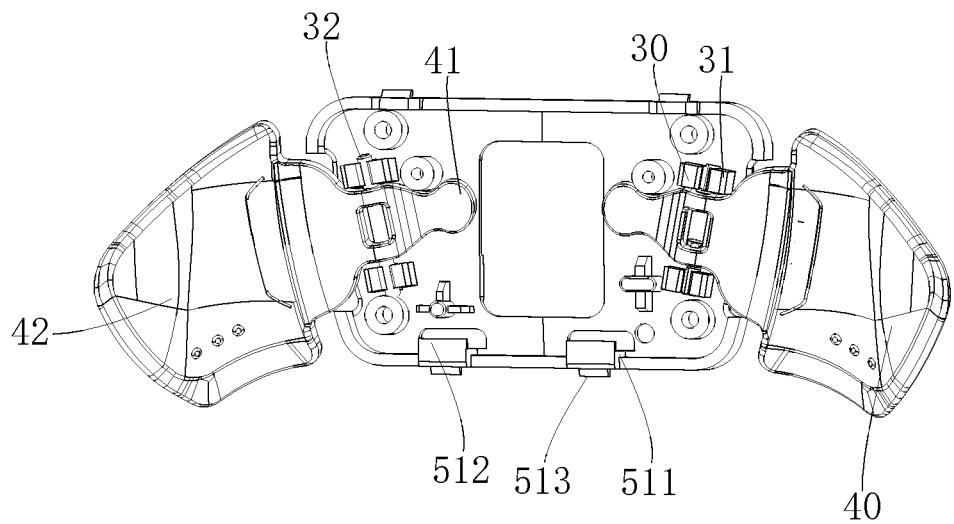
FIG. 6 is a schematic structural view of the first fixing member and the rotating structure provided in the first embodiment of this application.
Figure 7:
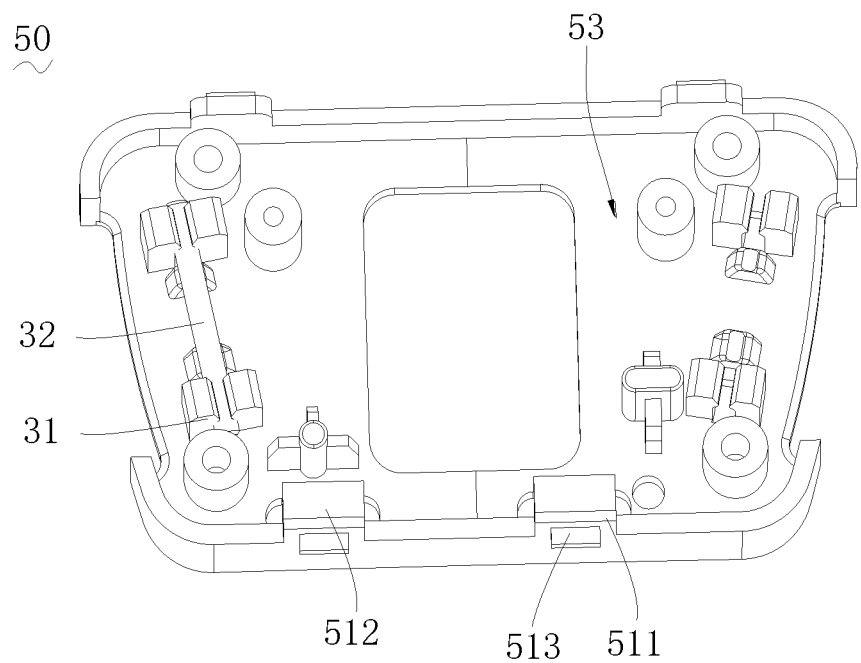
FIG. 7 is a first schematic structural view of the first fixing member provided in the first embodiment of this application.
Figure 8:
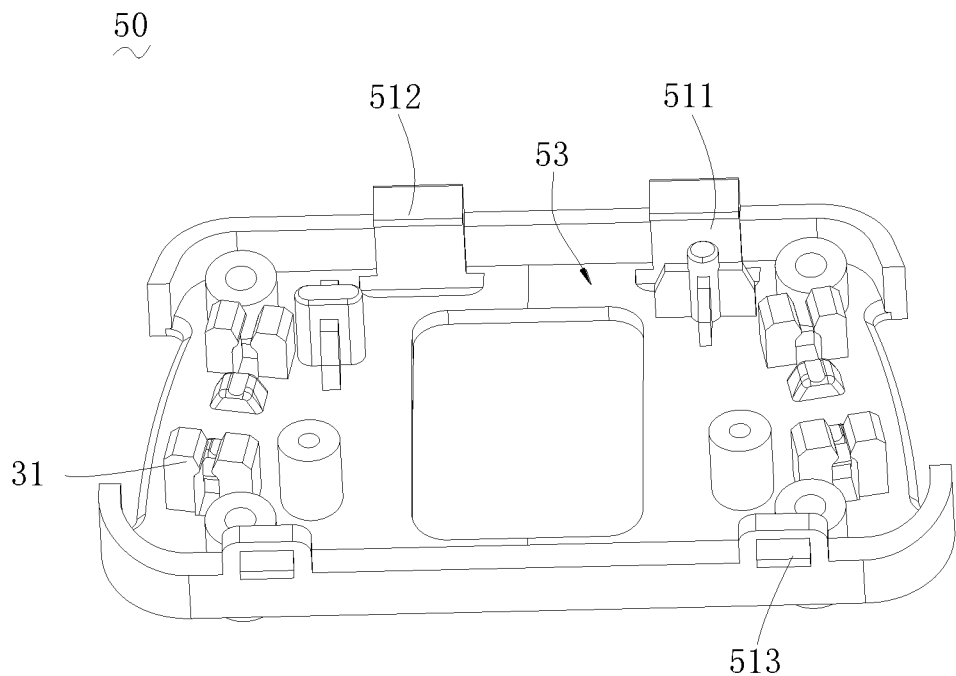
FIG. 8 is a second schematic structural view of the first fixing member provided in the first embodiment of this application.
Figure 14:
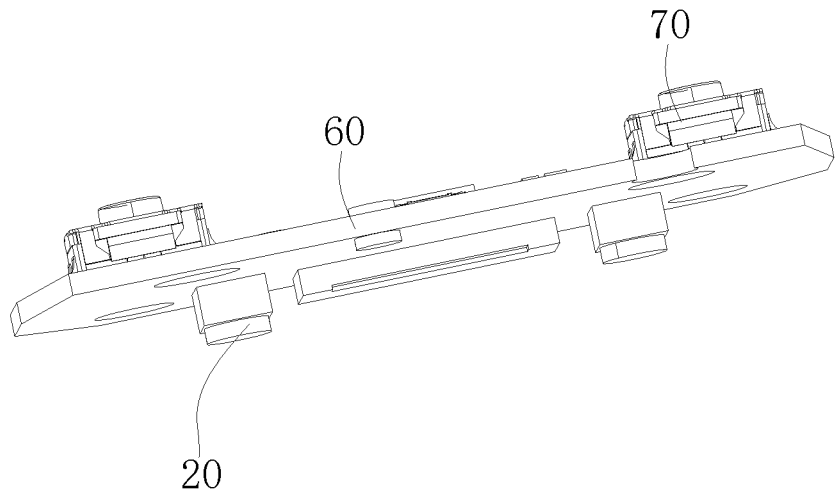
FIG. 14 is a schematic structural view of the second main board provided in the third embodiment of this application.
Figure 15:
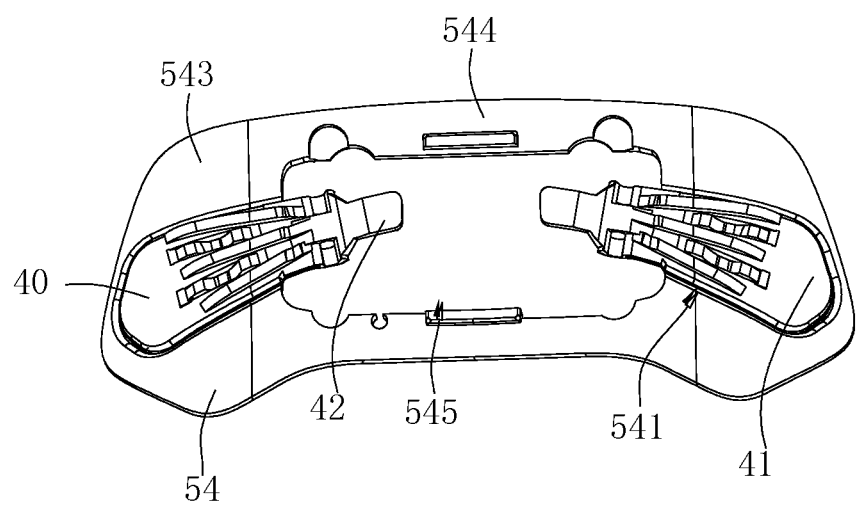
FIG. 15 is a schematic structural view of the pressing assembly provided in the third embodiment of this application.
Figure 16:
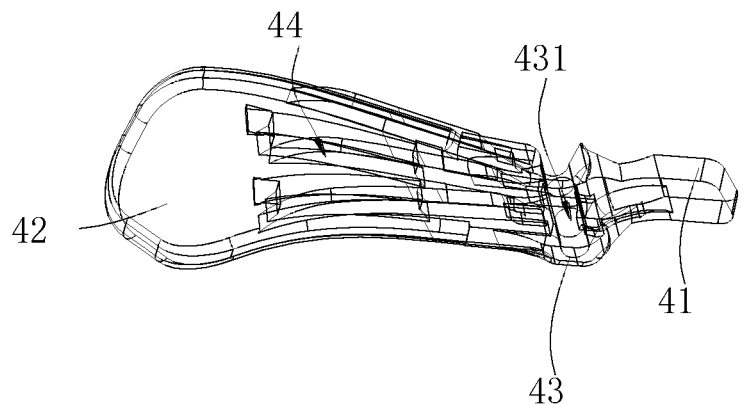
FIG. 16 is a schematic structural view of the pressing structure provided in the third embodiment of this application.
Figure 17:
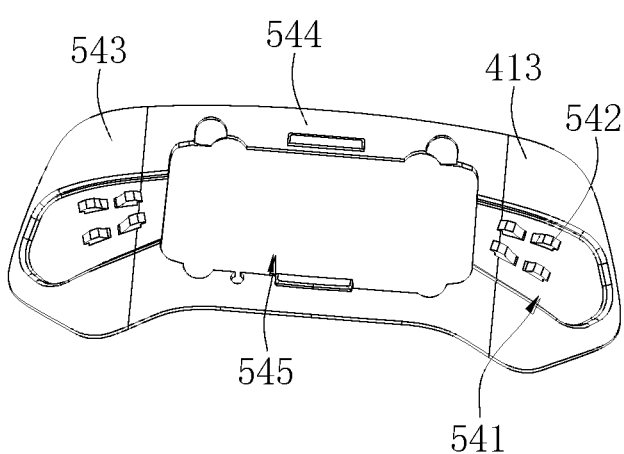
FIG. 17 is a schematic structural view of the pressing plate provided in the third embodiment of this application.

Referring to FIG. 5 and FIG. 14, in one embodiment, the first button (20) is arranged on a first side of the second main board (60). The second main board (60) also includes a second side opposite to the first side, which is provided with the second button (70) electrically connected with the second main board (60). The second button (70) penetrates through the second fixing member (52). By arranging the second button (70), when the user needs more specific skills for a specific game, the additional second button (70) can be operated. The operation of the second button (70) is the same as conventional buttons, and can be directly pressed by the user.

Figure 9:
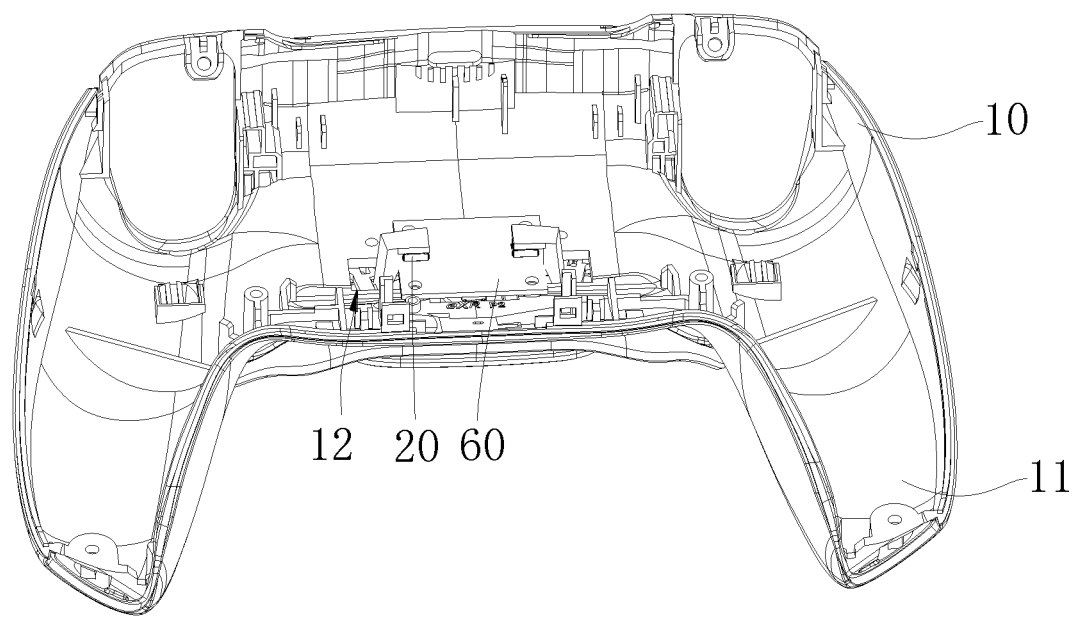
FIG. 9 is a schematic structural view of the first fixing member provided in a second embodiment of this application.

Referring to FIG. 9, in the second embodiment, only the position of the fixing assembly (50) is different from that in the first embodiment, and the fixing assembly (50), the second main board (60), the first button (20) and the pressing structure (40) are all the same as those in the first embodiment, so they will not be described in detail here.

Referring to FIG. 9, in the second embodiment, the first fixing member (51) is arranged on a side of the rear shell (10) facing the front shell, and the rear shell (10) defines second pressing holes (12) through which the pressing structures (40) pass. Each pressing structure corresponds to one second pressing hole (12), respectively. Unlike the first embodiment in which the fixing assembly (50) is outside the shell, when the fixing assembly (50) is arranged inside the shell, the second end portion (42) of the pressing structure

(40) needs to penetrate through not only the side wall of the fixing assembly (50), but also the second pressing hole (12) for the user to press.

Referring to FIGS. 10-17, in the third embodiment, the game controller further includes a pressing plate (54) which penetrates through the fixing assembly (50) and is fixed on the fixing assembly (50), and the pressing plate (54) is parallel to the second main board (60). One end of the pressing structure (40) is arranged in the pressing plate (54), and the other end of the pressing structure (40) is arranged near the first button (20), so that a user can press the pressing plate (54) to cause the pressing structure (40) press the first button (20). By arranging the pressing plate (54) parallel to the second main board (60), which penetrates through the fixing assembly (50) and is fixed on the fixing assembly (50), when the user presses the pressing plate (54), the pressing structure (40) can be driven to press the first button (20), and thus specific operation for a game can be realized by the user pressing a portion of the pressing plate (54) extending out of the fixing assembly (50), thereby improving the user's game experience.

Referring to FIG. 12 and FIGS. 15-17, in the third embodiment, the pressing plate (54) defines an embedded groove (541) for installing the pressing structure (40). The embedded groove (541) is provided with connecting protrusions (542), while the pressing structure (40) defines connecting slots (44) corresponding to the connecting protrusions (542). The connecting protrusions (542) are inserted into the connecting slots (44). By providing the embedded groove (541), it is convenient to fix the pressing structure (40) in the pressing plate (54), without increasing the thickness of the fixing assembly (50). Furthermore, by arranging the connecting protrusions (542) and the connecting slots (44), the pressing plate (54) and the pressing structure (40) can be fixed through the connecting protrusions (542) and the connecting slots (44), so that the pressing structure (40) will not be loosened, and the service life of the game controller is effectively guaranteed.

Figure 10:
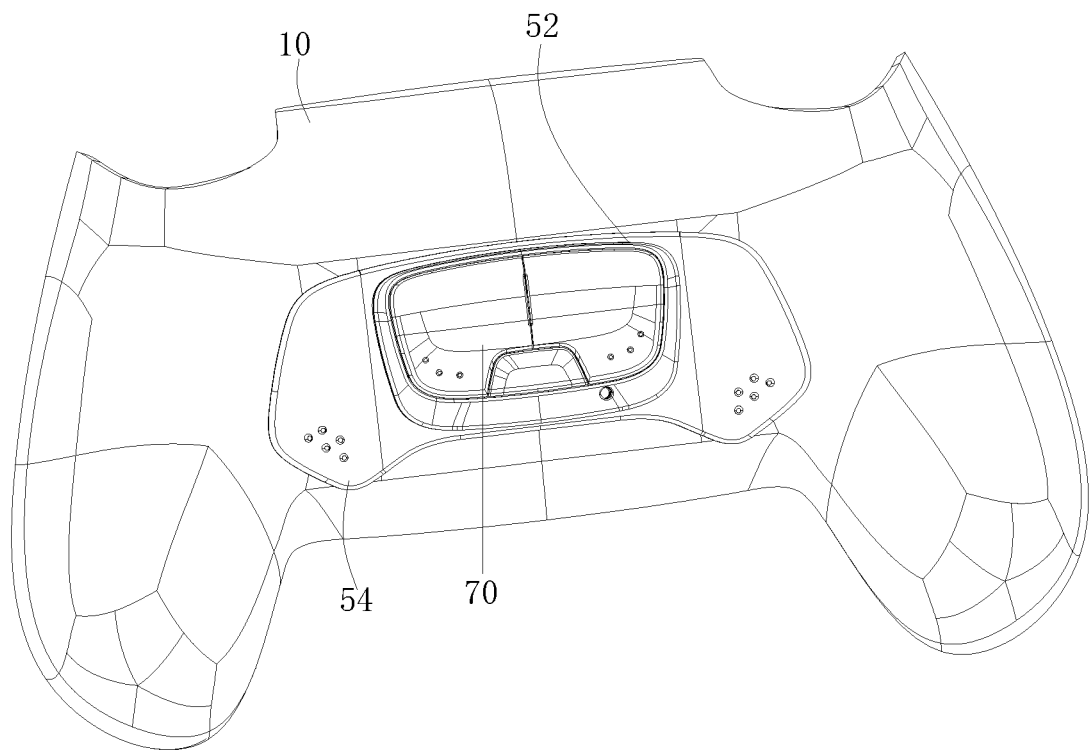
FIG. 10 is a schematic structural view of a game controller provided in a third embodiment of this application.
Figure 11:
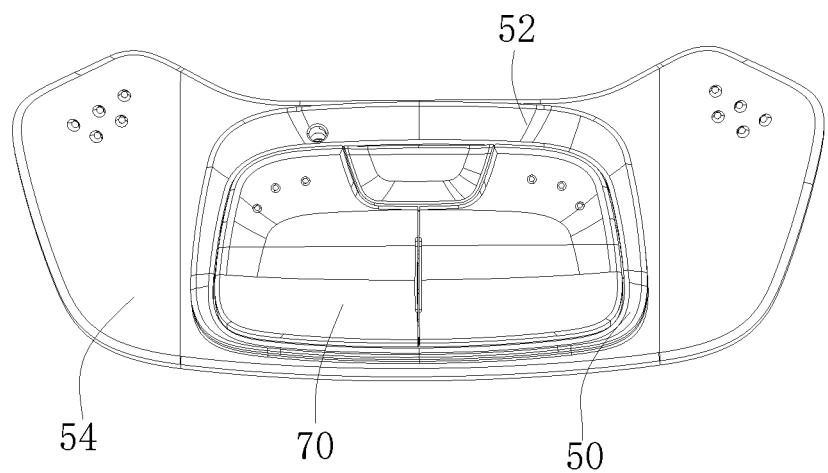
FIG. 11 is a first schematic structural view of a fixing assembly and a pressing assembly provided in the third embodiment of this application.
Figure 12:
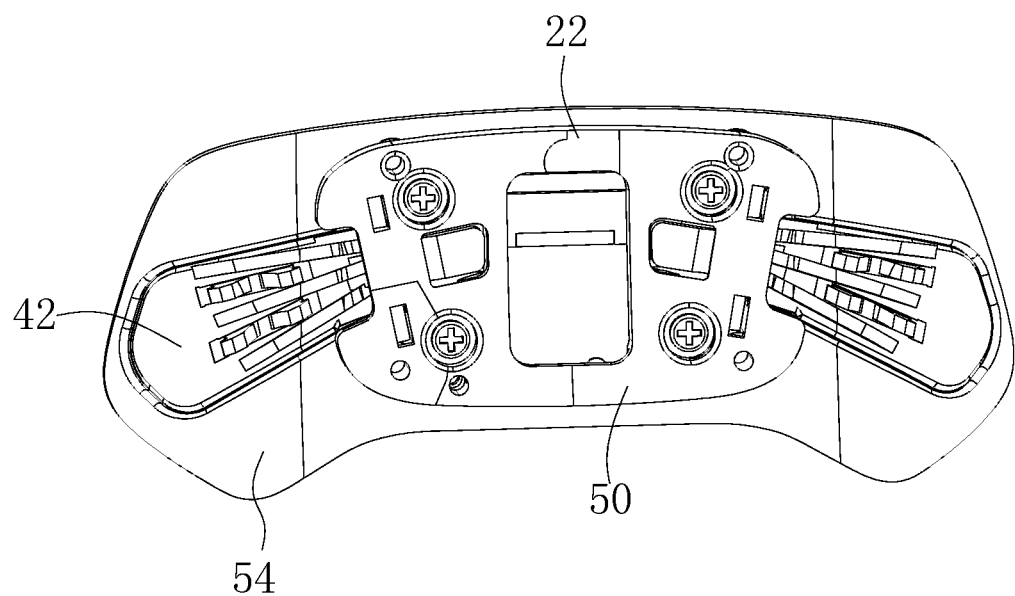
FIG. 12 is a second schematic structural view of the fixing assembly and the pressing assembly provided in the third embodiment of this application.
Figure 13:
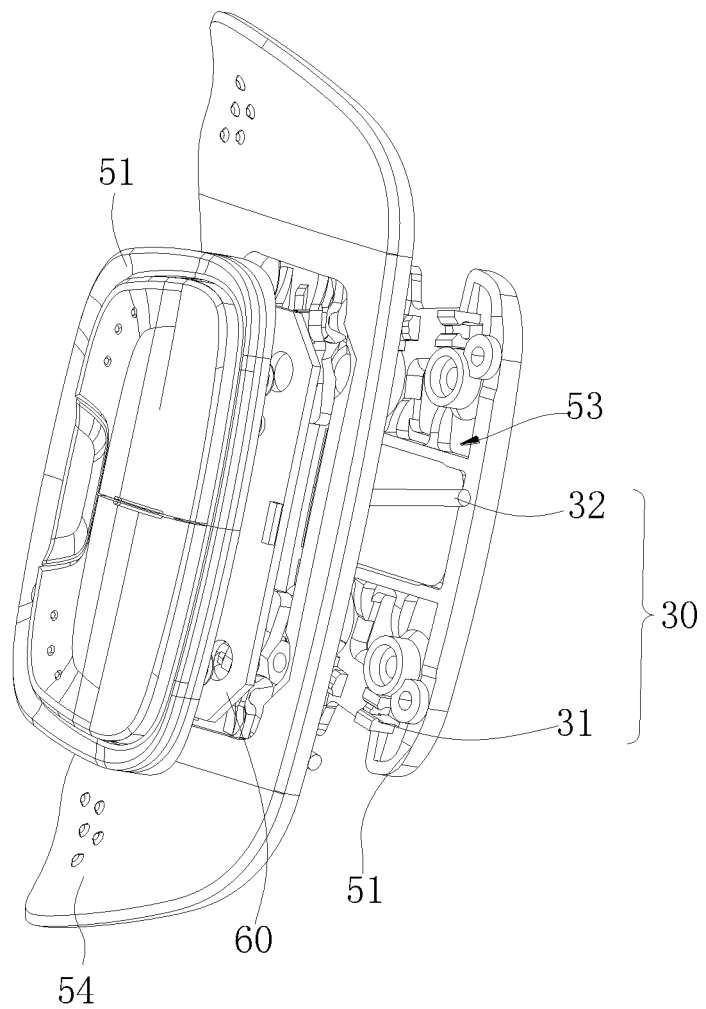
FIG. 13 is an exploded structural view of the fixing assembly and the rotating structure provided in the third embodiment of this application.

Referring to FIGS. 10-11 and FIG. 13, in the third embodiment, the first fixing member (51), the pressing plate (54) and the second fixing member (52) are stacked. The pressing plate (54) includes pressing ends (543) located on two sides and a fixing portion (544) located in the middle between the two pressing ends (543). The fixing portion (544) overlaps with both the first fixing member (51) and the second fixing member (52). The fixing portion (544) defines an escape hole (545) in the middle. The fixing portion (544) is fixed between the first fixing member (51) and the second fixing member (53). By fixing the fixing portion (544) between the first fixing member (51) and the second fixing member (52), when the user presses the pressing end (543) at one side, only the pressing structure (40) on the same side will be driven, and a single first button (20) will be successfully pressed, thus effectively avoiding multiple first buttons (20) being pressed by mistake.

Referring to FIGS. 12-13 and FIGS. 15-17, in the third embodiment, an upper edge of the first fixing member (51) is provided with a projection (511), which extends toward the fixing cavity (53) and is provided with a press-fit plate (512) for press-fitting with the second main board (60). The projection (511) is also provided with an engaging member (513) opposite to the press-fit plate (512). The second fixing member (52) is fixed on the first fixing member by the engaging member (513). By arranging the projection (511) which points to the second fixing portion (52) from the first fixing portion (51), and arranging the press-fit plate (512) on the projection (511) which can be used for press-fitting with the second main board (60), the second main board (60) can be additionally fixed. In addition, by arranging the engaging member (513) at a lateral side of the projection (511) and arranging a corresponding engaging member at a corresponding position on the second fixing member (52), the engaging member (512) and the corresponding engaging member can be removably connected.

The fourth embodiment also provides a game console, which adopts the above-mentioned game controller as a corresponding accessory. Because in this game controller, the first button (20) is arranged on the side facing the first main board, and a lever structure is formed by the combination of the pressing structure (40) and the fixing assembly (50) with the junction of the connecting portion (43) and the rotating structure (30) as a pivot, when the user presses the second end portion (42), the first end portion (41) can press the first button (20) synchronously so that the first button (20) can be operated by the pressing structure (40), and in turn the user can perform specific operation for a game by pressing the second end portion (42) located outside the fixing assembly (50), so as to improve the user experience.

In the fourth embodiment, the game console and the game controller are connected by wires. Specifically, the main board of the game console is connected with the first main board of the game controller through wires, and the game console can generate corresponding feedback by pressing the first button (20).

In the fourth embodiment, the game console is wirelessly connected with the game controller. Specifically, the way of wireless connection can be WIFI, Bluetooth, 4G or 5G, etc. The specific way of wireless connection is not limited here, as long as it can meet the requirement that the game console can generate feedback in time when the user presses the first button (20).

The above description is only of preferred embodiments of the invention, and is not used to limit the scope of the invention. Any modification, equivalent substitution and improvement made within the spirit and principle of the invention shall be included in the protection scope of this application.

The following is claimed:
1. A game controller comprising:
   a shell, including a front shell and a rear shell opposite each other;
   a first main board arranged in the shell;
   a first button electrically connected with the first main board,
   wherein a user can drive the first main board to generate feedback information when pressing the first button;
   a rotating structure fixed on the rear shell;
   a pressing structure comprising opposite first and second end portions and a connecting portion between the first and second end portions,
   wherein the connecting portion is rotationally connected with the rotating structure, the first end portion is near the first button, and a user can press the second end portion so that the first end portion presses the first button;
   a fixing assembly arranged on the rear shell; and
   a second main board arranged in the fixing assembly, wherein the first main board is electrically connected with the second main board and the first button is arranged on the second main board and faces a side of the first main board.

2. The game controller of claim 1, further comprising:
the fixing assembly comprising a first fixing member and a second fixing member corresponding to the first fixing member,
wherein a fixing cavity is defined in the first fixing member and the second fixing member for installing the second main board and the rotating structure is arranged on the first fixing member.

3. The game controller of claim 2, further comprising:
the rotating structure comprising a rotating base and a rotating shaft arranged at the bottom of the fixing cavity;
a connecting hole defined in the middle of the connecting portion for the rotating shaft to pass through,
wherein the rotating shaft passes through the connecting hole and the connecting portion can rotate relative to the rotating shaft.

4. The game controller of claim 2, further comprising:
at least two rotating structures,
wherein a plurality of rotating structures are arranged at intervals, each rotating structure is correspondingly provided with one pressing structure, and the second main board is provided with a plurality of first buttons each corresponding to one pressing structure.

5. The game controller according to claim 4, further comprising:
the first fixing member arranged on a side of the rear shell away from the front shell; and
the rear shell is provided with a wiring hole for wires electrically connecting the first main board and the second main board.

6. The game controller according to claim 4, further comprising:
the first fixing member arranged on a side of the rear shell facing the front shell;
the rear shell defines second pressing holes through which the pressing structures penetrate; and
each pressing mechanism corresponds to one of the second pressing holes.

7. The game controller of claim 3, further comprising:
a pressing plate penetrating through and fixed on the fixing assembly,
wherein the pressing plate is parallel to the second main board, one end of the pressing structure is arranged in the pressing plate, the other end of the pressing structure is arranged near the first button, and a user can press the pressing plate so that the pressing structure can press the first button.

8. The game controller according to claim 7, further comprising:
the pressing plate defines an embedded groove for installing the pressing structure;
wherein the embedded groove is provided with connecting protrusions, the pressing structure defines connecting slots corresponding to the connecting protrusions, and the connecting protrusions are inserted into the connecting slots.

9. The game controller according to claim 7, further comprising:
the first fixing member, the pressing plate and the second fixing member are stacked;
the pressing plate comprises pressing ends located at two sides and a fixing portion located in the middle between the two pressing ends;
the fixing portion overlaps with both the first fixing member and the second fixing member;
the fixing portion defines a pocket hole; and
the fixing portion is fixed between the first fixing member and the second fixing member.

10. The game controller according to claim 2, further comprising:
an upper edge of the first fixing portion is provided with a projection;
the projection extends toward the fixing cavity and is provided with a press-fit plate for press-fitting with the second main board;
the projection is also provided with an engaging member opposite to the press-fit plate; and
the second fixing portion is fixed on the first fixing portion through the engaging member.

* * * * *